April 11, 1933.  M. T. MURPHY  1,903,471
FLUID HEAT EXCHANGE SYSTEM
Filed Sept. 16, 1930   7 Sheets-Sheet 1

Inventor
Mortimer T. Murphy
By Bacon and Thomas
Attorneys

April 11, 1933.  M. T. MURPHY  1,903,471
FLUID HEAT EXCHANGE SYSTEM
Filed Sept. 16, 1930   7 Sheets-Sheet 2
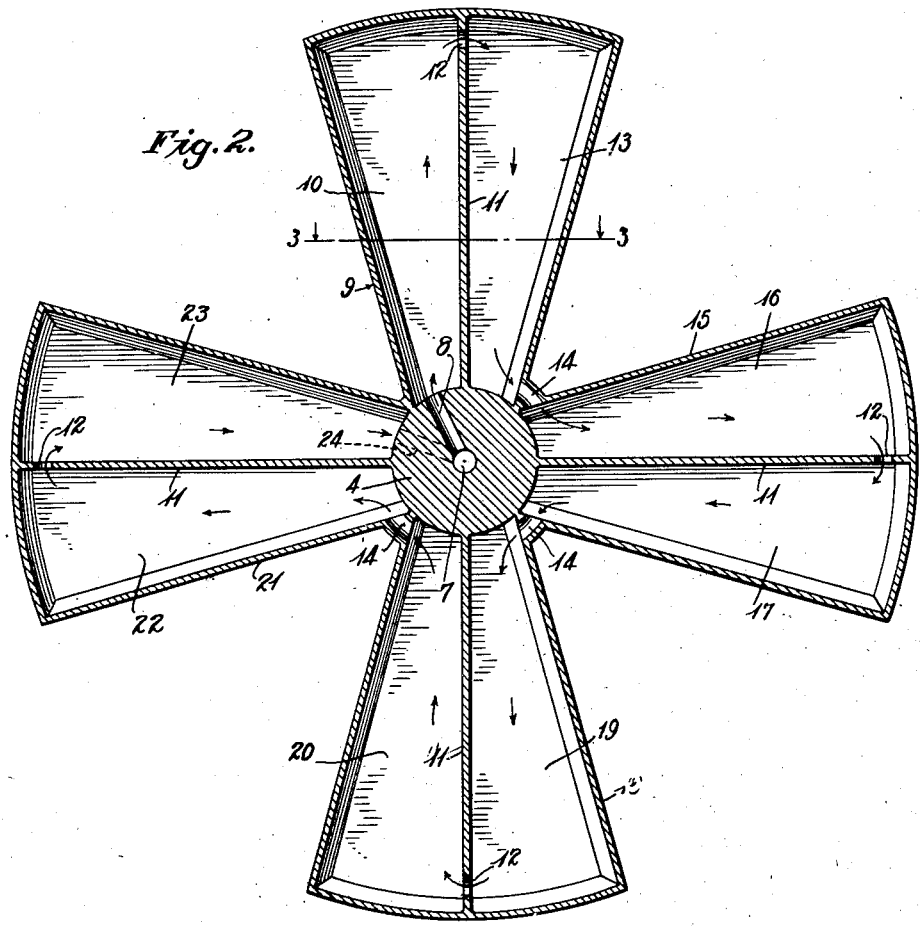
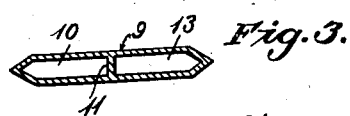
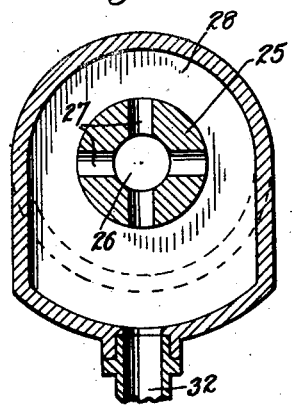
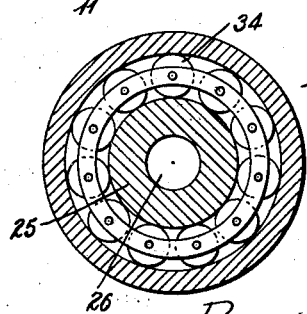
Inventor
Mortimer T. Murphy
By Bacon and Thomas
Attorneys

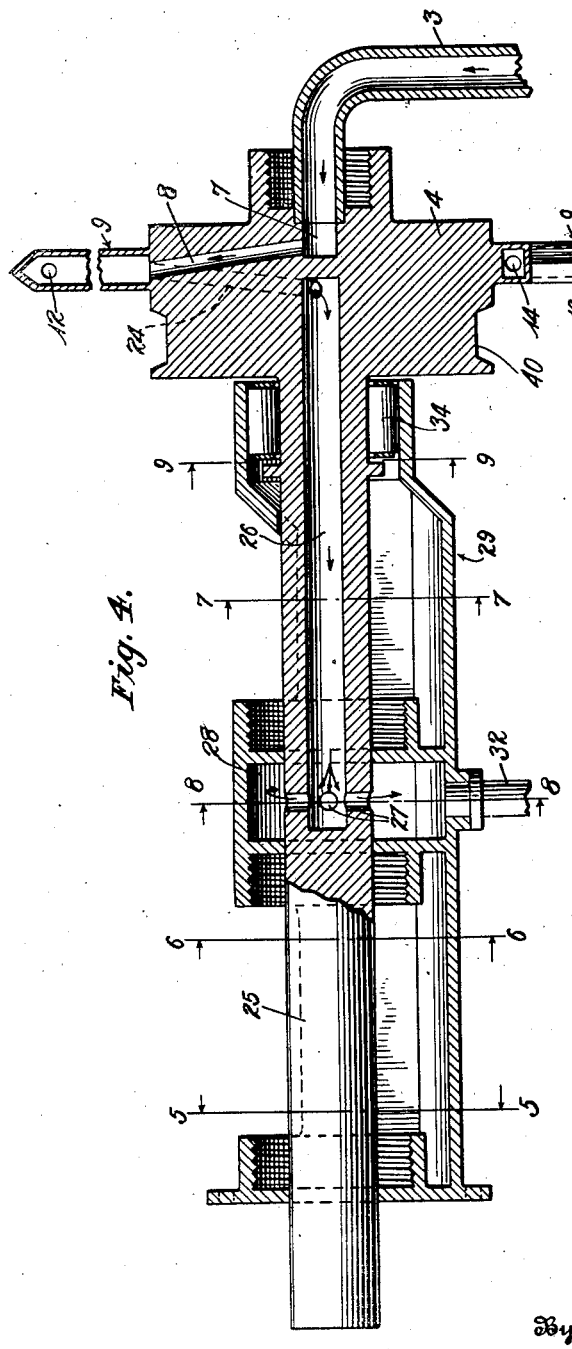

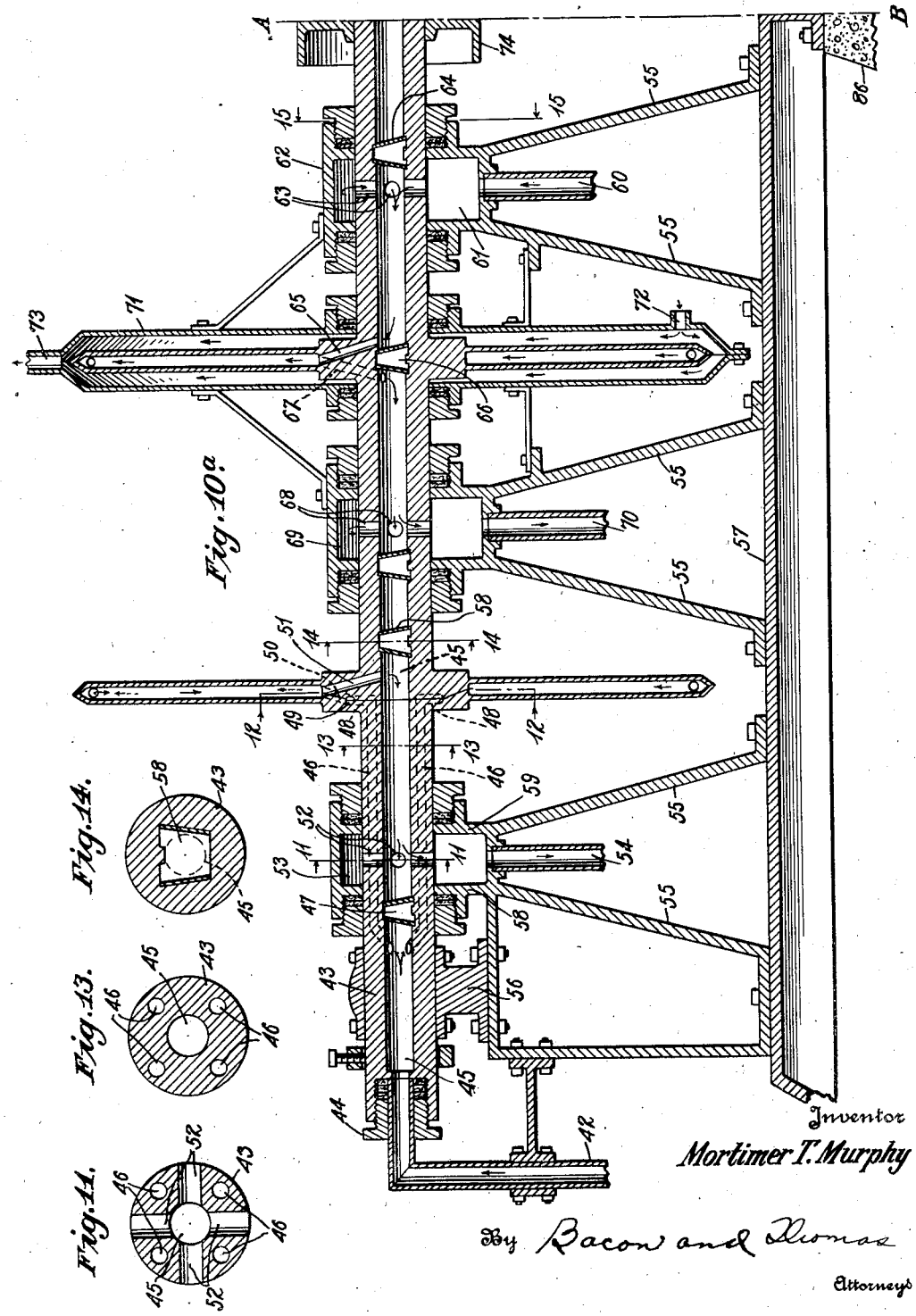

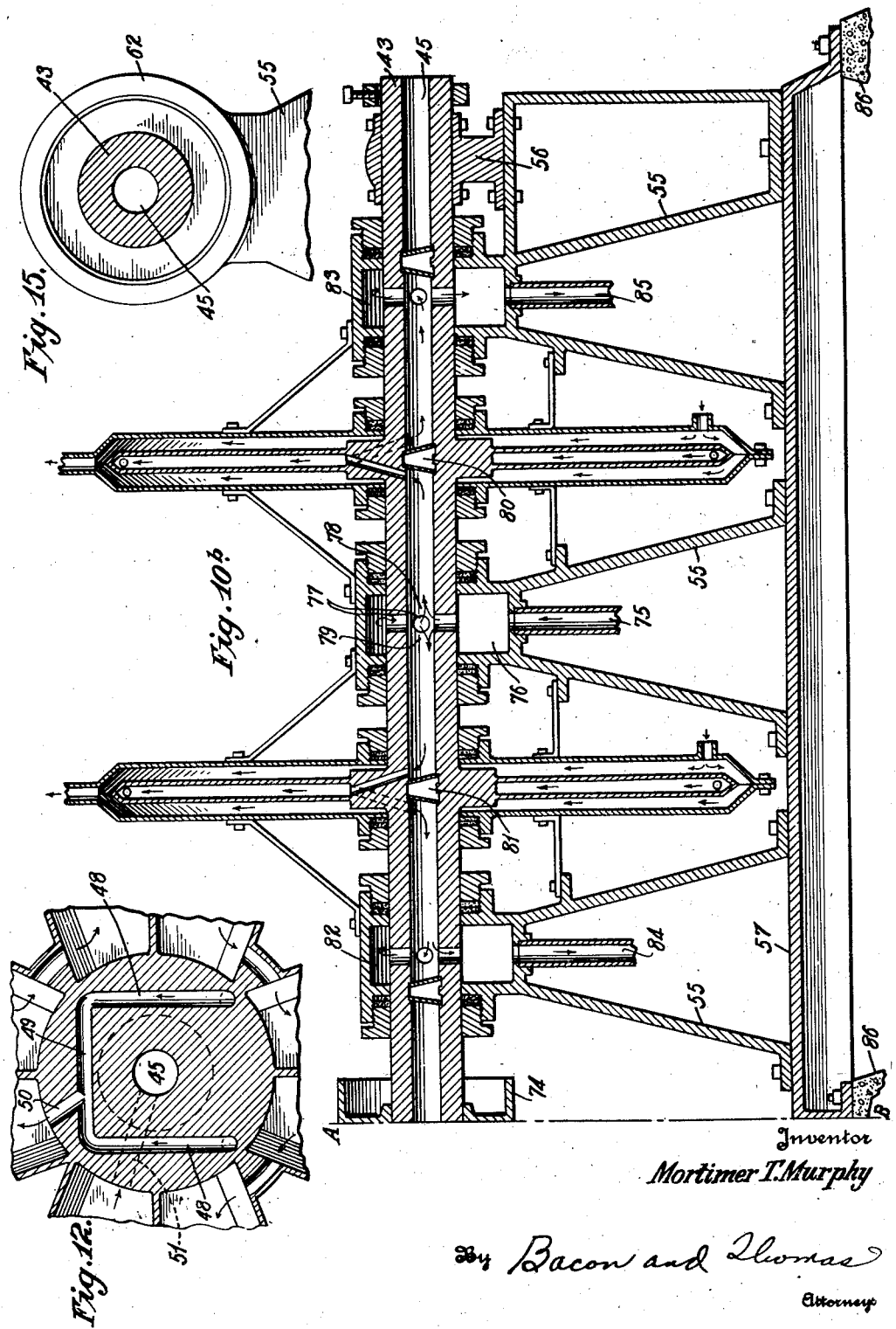

April 11, 1933. M. T. MURPHY 1,903,471
FLUID HEAT EXCHANGE SYSTEM
Filed Sept. 16, 1930 7 Sheets-Sheet 6
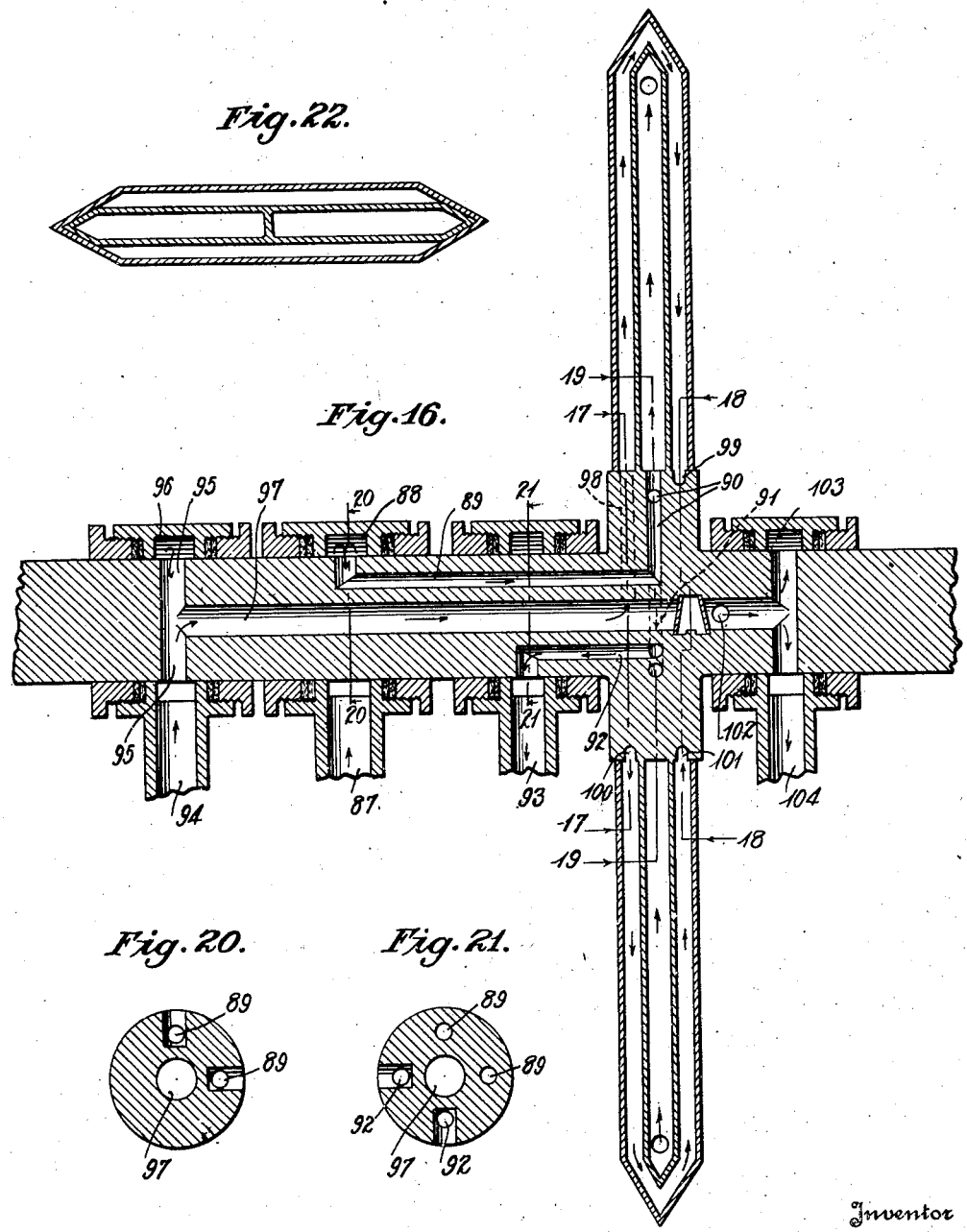
Inventor
Mortimer T. Murphy
By Bacon and Thomas
Attorneys April 11, 1933.    M. T. MURPHY    1,903,471
FLUID HEAT EXCHANGE SYSTEM
Filed Sept. 16, 1930    7 Sheets-Sheet 7

Inventor
Mortimer T. Murphy

By Bacon and Thomas
Attorneys

Patented Apr. 11, 1933

1,903,471

UNITED STATES PATENT OFFICE

MORTIMER T. MURPHY, OF IMLAY, NEVADA

FLUID HEAT EXCHANGE SYSTEM

Application filed September 16, 1930. Serial No. 482,313.

My invention relates to fluid heat exchange systems and apparatus; more particularly to apparatus for effecting rapid and efficient transfer of heat to or from a fluid under treatment, for the purpose of heating or cooling the same. It is an object of my invention to pass a fluid under treatment in heat exchange relationship with a heating or cooling medium in such a way that the fluid rapidly circulates in a thin film and undergoes a rapid heat transfer due to the great amount of surface exposed and due to the rapid circulation of fluid.

It is a further object of my invention to effect this rapid heat exchange in a continuous manner.

My invention in one of its forms recommends itself to use in automobile cooling systems, for example, to the cooling of a lubricant which is ordinarily used in automobile engines. It is adaptable also to use in connection with the water cooling system of an automobile. Its use is, however, not limited particularly to automobile fluid systems but is adaptable for use to any system in which a rapid and efficient heating or cooling of fluid is desired.

It is a further object of my invention to operate a multiple heat transfer system in accordance with the principle of my invention, in which many units operate simultaneously, and are energized from the same primary power source, for the purpose of heating and cooling independent fluids at the same time.

Another object of my invention deals with the provision of a novel heat contact means between the fluid under treatment and the heat exchanging medium, this contact being effected in accordance with my invention by rapidly revolving fans through which the fluid under treatment circulates to rotate within a casing through which the heating fluid circulates. Such casing may be either stationary with respect to the fan or may be formed to revolve with the fan.

Other objects and features of my invention will become evident from the following description and claims.

Referring to the figures of the drawings,

Fig. 2 shows a sectional front view of a form of fan which constitutes a portion of my invention.

Fig. 3 is a view taken along line 3—3 of Fig. 2 and illustrates a sectional end view of a blade of the fan shown in Fig. 2.

Fig. 4 is a sectional side elevation showing the structural detail of construction of the fan shaft bracket, together with the fan shaft.

Fig. 5 is a section taken along line 5—5 of Fig. 4.

Fig. 6 is a detail view taken along line 6—6 of Fig. 4.

Fig. 7 is a detail view taken along line 7—7 of Fig. 4.

Fig. 8 is a center line view taken along line 8—8 of Fig. 4.

Fig. 9 is a detail view taken along line 9—9 of Fig. 4.

Fig. 10$^a$ represents an elevation partly in section of a form of my invention in which several different units are combined and are operated from the same power shaft.

Fig. 10$^b$ represents a sectional elevation of a form of my invention differing from Fig. 10$^a$ only in the respect that several identical units are combined and operated from the same power shaft.

Fig. 11 is a detail view taken along line 11—11 of Fig. 10$^a$.

Fig. 12 is a broken sectional view taken along line 12—12 of Fig. 10$^a$.

Fig. 13 is a detail view taken along the line 13—13 of Fig. 10$^a$.

Fig. 14 is a sectional view of a stop plug taken along the line 14—14 of Fig. 10$^a$.

Fig. 15 represents an end view of a standard used as a shaft support and is taken along line 15—15 of Fig. 10$^a$.

Fig. 16 represents a side elevation in section of a modification of my invention.

Figure 17:
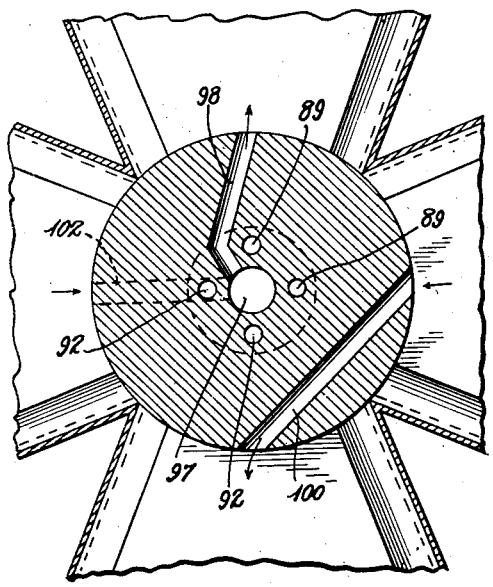

Fig. 17 represents a broken sectional view of a portion of the fan shown in Fig. 16 taken along the line 17—17 of Fig. 16.

Figure 18:
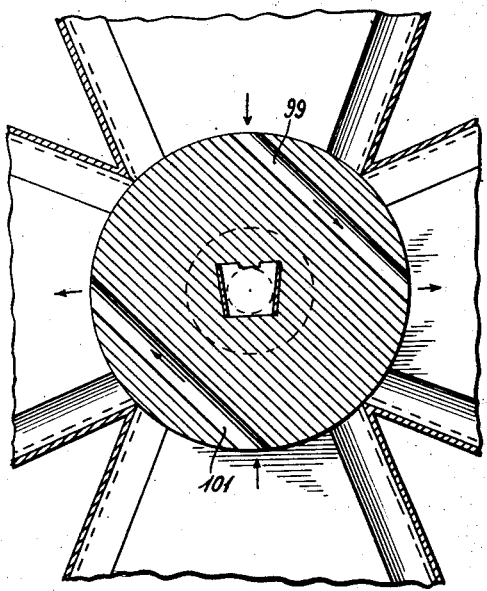

Fig. 18 is a broken sectional view taken along line 18—18 of Fig. 16, showing certain fan details.

Figure 19:
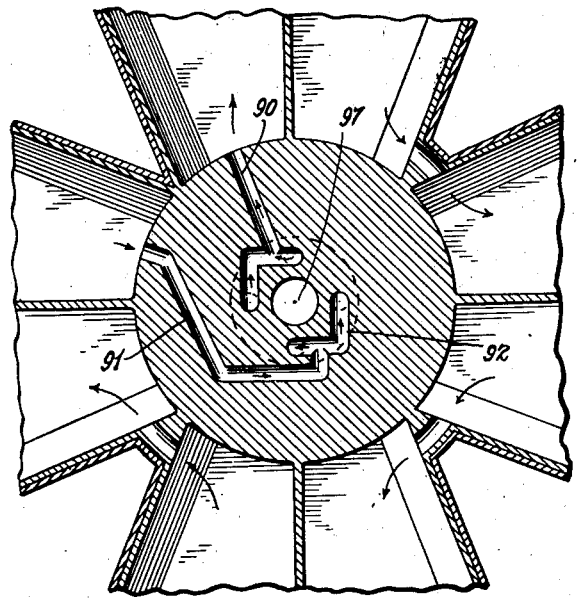

Fig. 19 is a broken sectional view taken along line 19—19 of Fig. 16, showing further details of the fan construction.

Fig. 20 is a sectional view of a portion of the fan shaft taken along the line 20—20 of Fig. 16.

Fig. 21 represents a sectional end view taken along the line 21—21 of Fig. 16.

Fig. 22 represents a sectional end view of a fan blade of the type shown in Fig. 16.

Figure 23:
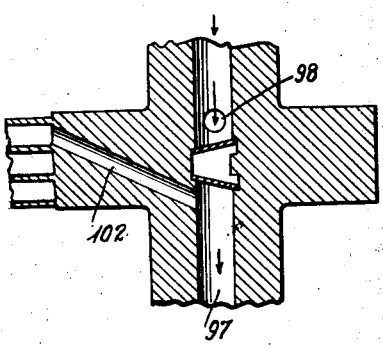

Fig. 23 represents a detail view showing the flow of the cooling or heating fluid as it leaves the fan.

Referring to the drawings, and more particularly to Figs. 1 to 10ª, my invention is shown as applied to the lubricating system of an automobile. The hot lubricating oil is drawn by means of oil pump 1 through pipe 2 and is forced through conduit 3 which extends at its upper portion through hub 4 which constitutes a portion of a rotating fan. The connection between the hub 4 and the conduit 3 is made leakproof by means of packing gland 5 which has associated therewith a packing 6. The packing gland is adapted to rotate with the hub 4, being attached thereto by means of screws or other equivalent means, the hot oil passing through pipe 3 into passage 7 which is formed concentrically with the hub 4 and which connects with conduit 8 leading therefrom into one of the fan blades 9. The fan blades are hollow and formed preferably of thin sheet metal, welded at the edges, each fan blade being formed with a division strip 11 positioned approximately centrally of the fan and extending transversely therein to divide the fan into compartments. The division strip 11 of each blade is provided with an aperture 12 at its outer portion. Although the preferred form of fan blade is shown in the drawings as having a single division strip 11, my invention contemplates forming each fan blade with any number of hollow compartments, by using as many division strips 11 as may be desired to form the desired number of compartments. Where more than one division strip 11 is formed in each fan blade, the passage of fluid through successive compartments will be effected by forming additional holes 12 in said division strips in the same way as indicated in the preferred form shown in the drawings. The fan blades, with the exception of one pair of the blades, are joined together adjacent the hub 4 by a web member which is spaced from the hub to form passages 14 between the blades. Blades 9 and 15 are connected by means of one passage 14, and blades 15 and 18 are likewise connected through a passage 14 at one side of their base portions. Blade 21 connects with blade 18 similarly by means of a passage 14 but between blades 21 and 9 there is no passage. Blade 21 is formed at the other side of the base portion opposite the passage 14 which connects it with blade 18, with a conduit 24 which is formed in the hub 4 and which leads into a further passage 26 which is formed lengthwise and concentrically of the hub 4. It will thus be seen that the hot oil passes from the hub into blade 9, passing upwardly through compartment 10 therein through aperture 12 into opposite compartment 13 downwardly therethrough and passes into compartment 16 in blade 15 through passage 14 which joins blades 9 and 15. The oil then courses through blade 15 in a similar manner passing out therefrom through passage 14 into blade 18. It passes upwardly through blade 18 through aperture 12 downwardly through the opposite compartment of blade 18 into blade 21 through passage 14, upwardly through blade 21, passing through the aperture in the division strip and then passes in the opposite direction through the blade 21 and out of the fan through passages 24 and 26.

Passage 26 is formed longitudinally of the rotating shaft 25 to which the hub member 4 is secured or made integrally. From 26 the cool oil goes into holes 27 which are drilled crosswise of the shaft 25. The arrangement of passages 27 is well shown in Fig. 8 of the drawings. From passages 27 it courses into space 28 which is formed as a leak-proof compartment by means of suitable packing as shown, and escapes through conduit 32 by means of which it may be returned to the lubricating system. Shaft 25 is mounted for rotation in a fan bracket 29 which is secured in any desired manner to a supporting structure. Packing glands 30 and 31 effect a leakproof connection between the shaft 25 and compartment 28. A further packing gland 35 is provided to seal the connection between the rotating fan shaft 25, water circulating pump 33 and water jacket 38. Roller bearings 34 may be provided between the fan bracket and the rotating shaft for the purpose of reducing friction.

Figure 1:
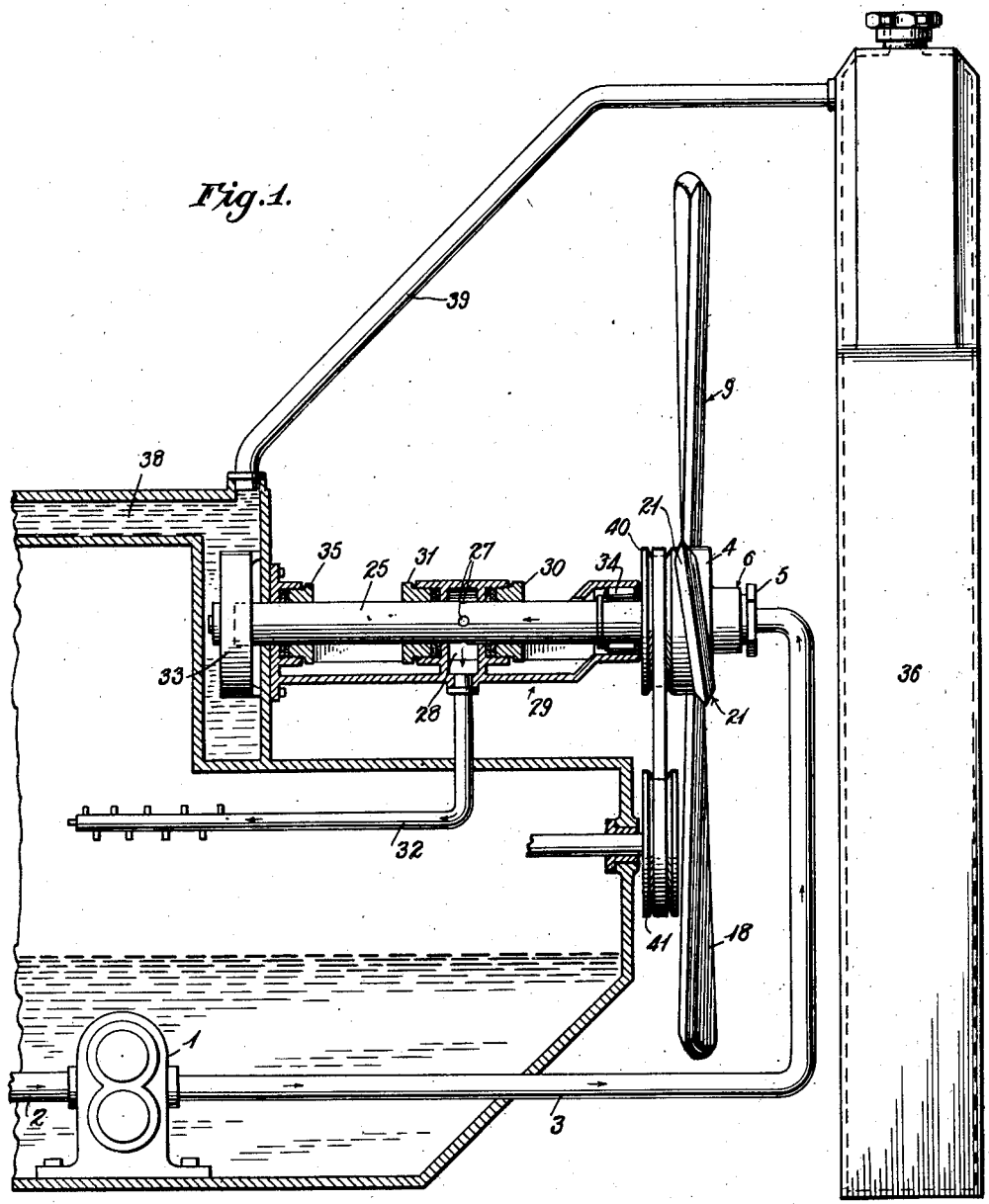
Fig. 1 represents a sectional view of the form of my invention applied to the lubricating system of an internal combustion engine.

There is incidentally shown in Fig. 1 in connection with the oil circulating system a cooling radiator 36 for the water cooling system which is adapted to be connected to the system by means of a water discharge hose 39 which leads to the radiator from the water jacket 38. A water pump 33 is provided on the end of the rotating fan shaft 25 for the purpose of effecting the proper water circulation. The fan is operated by means of a connection from pulley 41 to pulley 40 which is formed upon the hub portion 4.

Details of construction of the arrangement shown in Fig. 1 as one form of my invention are clearly brought out by reference to Figs. 2 to 9 inclusive. The relationship between the fan bracket and the rotating shaft, together with the passages associated therewith, is clearly shown in Fig. 4. Figs. 5 to 9 represent various cross-sectional views taken through the rotating shaft for the purpose of more clearly bringing out the various features of construction.

It will be understood from a consideration of the above description that a comparatively simple, compact and very efficient cooling system is obtained. The fan is adapted to be rotated rapidly, the rotation being so regulated that the oil will pass in a continuous thin film throughout the various compartments formed in the fan blades until it has traveled completely around the fan. Thus the maximum amount of cooling surface is exposed, effecting a very rapid cooling of the oil passing through the fan.

Obviously my invention is not limited to the construction shown in the figures. It might as effectively be applied to the heating of fluids as to the cooling of fluids. One of the most salient features of my invention is the provision of a maximum amount of surface for a fluid passing through the fan so that a rapid transfer of heat, whether heating or cooling, is brought about by reason of the rapid rotation of the fan.

Ordinarily, and particularly where the invention is applied for cooling lubricating oil in combustion engines, the cooling fluid is air. The heat from the fluid passing through the fan is rapidly dissipated into the atmosphere by reason of the rapid rotation of the fan and a continuous passage of the oil therethrough in the manner described. However, other cooling fluids than air may be used depending upon the nature of the operation to which my invention is applied.

Among other things, my invention may be used for the cooling of liners in electric refrigerators, and may be utilized for the cooling of water in water cooling systems for engines, by passing the cooling water from the motor through the fan or propeller which I have described as part of my invention. The application to the cooling of water in water cooling systems limits the necessity of having a radiator for effecting this same result.

Further developments of my invention are shown in Figs. 10$^b$ to 23 inclusive. These figures indicate alternative methods of effecting the fluid circulation through the fan shaft and the propeller blades, and also represent an application of the principle of my invention to a battery of heat exchange units of the character above described in connection with Figures 1 to 9. Such units may be maintained either in the form of a series of units for heating various fluids, for cooling fluids of different character, or the units may be designed to effect a simultaneous heating and cooling of different fluids under treatment.

Referring particularly to Fig. 10$^a$, the fluid to be treated, for example, a hot liquid which is to undergo cooling, is introduced into conduit 42 which leads into rotating shaft 43 upon which the various propellers or fans are mounted for rotation. A fluid-tight seal is effected between conduit 42 and the rotating shaft 43 by means of a packing gland 44. The hot liquid passes through the passage 45 formed concentrically within the rotating fan shaft and is diverted into a plurality of passages 46 which lead from the main passage, the flow of fluid through the main passage being blocked off by stop plug 47. Passages 46 are preferably four in number, although a greater or less number of passages might be used. Passages 46 lead into transverse passages 48 formed in the fan hub, the liquid being conducted therefrom by means of a common passage 49 which connects transverse passages 48 into passage 50 which conducts the fluid into the first division of the first fan blade. The liquid then courses through the fan blade in the manner as was described above in connection with the operation of Figs. 1 to 9. After circumnavigating the fan the cooled liquid is led away from the last fan compartment through passage 51 and is diverted into central longitudinal passage 45 by means of stop plug 58, being outwardly diverted therefrom by means of transverse passages 52, preferably four in number and positioned between the passages 46. Passages 52 lead into a common annular space 53, the fluid passing therethrough being then conducted to an exit passage 54 from which it is returned to its proper place of use.

Where more than one fan is mounted on a single rotating shaft, the hubs are not made integral with the latter, the latter being mounted upon supports 56 through the medium of a bearing 55. The supports are suitably affixed to a base plate 57. Packing glands are provided between the rotating shaft and annular passage 53 similarly to the manner described in connection with Figures 1 to 9. The relationship between passages 46 and annular space 53 and passages 52 is shown in Fig. 11, and the flow of the fluid to be cooled or heated from the rotating shaft into the fan blades is outlined in Fig. 12. Fig. 13 is a view of a portion of the rotating shaft and further indicates the relationship between fluid passages 46 and the central longitudinal passage 45.

The annular passage 53 may be formed within an extension 58—59 which can be formed integrally with supporting member 55 by casting or by any other method.

Mounted upon the same rotating shaft and adapted to operate simultaneously with the cooling unit just described are additional units of similar character which I will now describe in detail. A second fluid to be treated, whether for the purpose of heating or cooling the same, is led into the conduit 60 which leads into annular space 61 formed within a casing member 62 which is preferably formed integrally with supporting members 55 upon which the rotating shaft is mounted. The casing member 62 may, similarly to member 59, be cast together with supports 55 into an integral structure.

The fluid is led from space 61 into transverse passages 63 formed in the fan shaft and is diverted therefrom by the plug 64 into the central passage 45 and from thence to passage 65 formed in the fan member of the second rotating fan, being diverted in passage 65 by means of stop plug 66. The liquid is then circulated through the fan in the manner described above in connection with the other fan units of my invention, and is withdrawn through passage 67 into longitudinal passage 45 out through transverse passages 68 which lead into another annular space 69 and out through passage 70 where it is returned for use to the proper place. Packing glands are provided between the various fluid passages and the rotating shaft as shown.

For the purpose of effecting an efficient heat exchange I may mount a casing 71 upon supporting members 55, to surround the rotating fan. Casing member 71 may be maintained fixed with relation to the supporting members 55 as shown or may be mounted to rotate with the fan if so desired. A fluid is introduced into the casing member 71 by means of pipe 72, being diverted to pass completely about the fan, due to the position of the fan in the central portion of the casing. The heat exchanging fluid which is adapted either to heat or cool the fluid which passes within the fan, courses upwardly, in contact with the fan at all times and is removed at the upper portion of the casing through pipe 73. The velocity of the heat exchanging fluid which passes from the casing may be regulated as desired dependent upon the conditions of heating or cooling.

Other units are mounted upon the rotating shaft at opposite sides of its central support than those already described. The shaft is mounted preferably in two end bearings 56 which are suitably connected with the supporting members. In accordance with my invention, the various stresses upon the rotating fan shaft may be equalized by placing the various heat exchange units on opposite sides of the driving pulley 74.

On the right hand side of the driving pulley 74 and adjacent thereto I have shown another unit which operates substantially in the same manner as the unit just described which is placed adjacent the driving pulley 74 on the left-hand side of Fig. 10ª. This unit may be further combined in its operation with an additional unit which operates in the same way, the stream of fluid under treatment being split to pass simultaneously through both units. The method by which this is done is illustrated clearly in Fig. 10ᵇ the fluid passing up through conduit 75 into annular space 76, passages 77 are divided, being led partly into the right-hand portion 78 of the longitudinal passage and partly into the left-hand portion 79. The fluid is then passed into the fan in the manner described in connection with the heat exchange unit disposed immediately adjacent the left-hand side of the driving pulley 74, being diverted into the fan by means of stop plugs 80 and 81. The fluid after proper circulation through the fan is then led back to its place of use through the longitudinal passage into annular spaces 82 and 83 respectively and thence into respective exit passages 84 and 85.

The mounting of the rotatng fan shaft and its associated heat exchanging units will be evident from an inspection of Figs. 10ª and 10ᵇ of the drawings. The assembly is mounted upon a bed plate 57 which is in turn supported upon suitable foundations 86 in any proper manner. The various portions of the shaft adjacent each unit are mounted upon supporting legs 55 which, as has been stated, are preferably provided with integral extensions, which serve simultaneously as bearings for the shafts and also to provide annular chambers into which the fluid being treated is introduced. The shaft is mounted upon two end bearings 56. By reason of the positioning of the various units, the same number of units being on each side of the driving pulley 74, a desirable arrangement is effected, eliminating much strain and wear from the rotating fan shaft.

Where more than one fan is desired to be assembled, on the driving shaft, passages are drilled in the shaft as desired, and those portions of the passages which are not intended for use may be plugged up in any desirable fashion. Holes are formed for the reception of the stop plugs, the plugs being screwed into their proper places in the shaft, that portion not filled by the stop plug being filled in, if desired, by welding, soldering, or other expedients, the shaft being then machined to the desired smoothness. The hubs of the fans are then pressed onto the shaft in proper relationship to the other elements of the assembly, the passages in the hubs registering with corresponding passages in the shaft.

From the discussion of the mode of operation of Figs. 10ª and 10ᵇ it is evident that any number of units of the type described as embodied in my invention may be combined to operate at the same time and to be driven from the same source of power. The description of the figure is illustrative merely. Many changes can be made in construction without departing from the spirit of my invention. For example, in lieu of introducing fluid from independent sources into each unit, the fluid from a preceding unit may be introduced into the feed conduit of the succeeding unit and vice versa, or all the units may be operated upon a single fluid by a suitable arrangement of piping between the entrance and exit conduits of the different units. The manner in which this may be accomplished will be evident to one skilled in the art. The units may be used interchangeably for heating or cooling, or they may all be used for the purpose of heating or alternately they may all be used for the purpose of cooling. I consider these various alternates as embraced within the scope of my invention.

In Fig. 16 is shown a modification of my invention in which the fan is surrounded by a casing through which suitable heating or cooling fluid is circulated, the casing being mounted upon the same hub as the fan for the purpose of rotating therewith. The fluid to be treated is introduced through entrance passage 87 into annular space 88, thence through suitable passages 89 disposed longitudinally of the shaft into passage 90 which leads to the first compartment of the first fan blade. The fluid then circulates through the fan in the manner described in connection with the other forms of my invention and is exhausted through passages 91, 92 and 93. The heat exchanging fluid that is adapted either to absorb heat from the fluid to be treated or to impart heat thereto passes through separate entrance passage 94, annular chamber 96 into transverse passages 95. It then goes through longitudinal passage 97 into transverse passage 98 which is formed in the hub of the fan. The fluid then circulates around the exterior of the fan being exhausted through passages 99, 100, 101, 102, annular space 103 and exhaust passage 104. The flow of the heat exchanging fluid throughout the casing member is indicated in Figs. 17 and 18 which are taken in section in the casing member as shown.

In Figures 17 and 18, the casing is shown as being formed around each individual blade of the fan. This is a preferred form but it also is understood that the casing member might be shaped other than to surround the individual blades.

Fig. 19 shows clearly the method of circulating fluid to be treated within the fan and out through the fan hub. Figs. 20, 21 and 23 are detail views taken as indicated, and Fig. 22 is a sectional view taken to indicate the relationship between the casing member and the fan blade.

It will be understood that this alternative structure may be substituted in the assembly shown in Figs. 10$^a$ and 10$^b$ on any of the units therein shown. The type or unit which is to be used depends upon the nature of the fluid to be treated, the degree of heating or cooling, the speed of heat exchange desired, and upon many other conditions and circumstances. I do not desire to be limited, therefore, to the use of any specific nature of the assemblies which I have shown but contemplate their use interchangeably.

The control of the temperature of both the fluid being treated and the heat exchanging fluid may be affected by the use of suitable thermostats, any desired temperature being thereby automatically regulated.

I claim as my invention:

1. In a heat exchange system for fluids, in combination, a shaft mounted for rotation upon a suitable support, a fan having its hub portion mounted on the shaft and secured for rotation therewith, the fan being provided with a series of blades formed with hollow interior portions, the first blade only of said series being provided with an entrance opening through which fluid is admitted to its hollow portion, said blade having an opening in its wall adjacent the base thereof connected to an opening in the wall of an adjacent blade, to provide a conduit connecting the hollow portion of the blade with the hollow portion of an adjacent blade, the succeeding blades in the series having their hollow portions similarly connected to the hollow portions of the preceding blades, the last blade only in the series being provided with a passage at its base through which the fluid circulating through the fan blades is withdrawn.

2. In a heat exchange system for fluids, in combination, a shaft mounted for rotation upon a suitable support, a fan having its hub portion mounted on said shaft and secured for rotation therein, said fan being provided with a series of blades each of which is provided with a hollow interior portion, said blades being provided also with a division strip which sub-divides the hollow portions into separate compartments, said division strips being provided with a passage at their outer end whereby fluid may pass from one compartment to the other, the first blade in said series being provided with an entrance passage in one of its compartments at the base thereof for admitting fluid to said compartment, the blade having an opening in its wall adjacent the base thereof connected to an opening in the wall of an adjacent blade to provide a conduit leading from said other compartment at the base thereof and connecting with the base portion of one of the compartments of an adjacent blade of the series, the succeeding blades each being connected with the preceding blades of the series by a similar conduit, the last blade of said series having a passage leading from one of its compartments whereby the fluid which is circulated through the fan may be withdrawn.

3. In a heat exchange system for fluids, in combination, a shaft mounted for rotation upon a suitable support, a fan having its hub portion mounted on the shaft and secured to rotate therewith, the fan being provided with blades having hollow interior portions, one of said blades having a passage leading into the hollow portion thereof through which fluid is admitted, the blade having an opening in its wall adjacent the faces thereof connected to an opening in the wall of an adjacent blade, to provide a passage leading therefrom into the hollow portion of a succeeding blade and adapted to effect withdrawal of the liquid from one blade to another, the hollow portions from succeeding blades being similarly connected to the hollow portions of preceding blades, the hub portion having passages formed therein which register with the passages for permitting entrance and withdrawal of the fluid from the fan, the shaft being provided likewise with passages forming a continuation of the hub passages, fluid being admitted to the shaft passage which cooperates with the entrance passage of the fan, circulating throughout the various blades of the fan and being exhausted through the other shaft passage.

4. In an oil lubricating system for automobiles, in combination therewith, an oil reservoir, an oil pump, a conduit leading from the oil reservoir and into which hot oil is discharged through the medium of the oil pump, a shaft mounted for rotation upon a suitable support, the conduit leading into a passage formed in the shaft, a fan having its hub portion secured to the shaft for rotation therewith, the hub portion being provided with a passage forming a continuation of the shaft passage, the fan being provided with a series of blades having hollow portions formed therein, one of said blades being formed with an entrance opening which registers with the hub passage, the succeeding blades having their hollow portions connected to the hollow portions of the preceding blades by means of a conduit spaced from the axis of the shaft, one of said succeeding blades being provided with a passage through which fluid is withdrawn from the fan, said last named passage leading into an exit passage formed through the hub portion and the rotating shaft.

5. In an oil lubricating system for automobiles, in combination therewith, an oil reservoir, an oil pump, a conduit leading from the oil reservoir, and into which hot oil is discharged through the medium of the oil pump, a shaft mounted for rotation upon a suitable support, the conduit leading into a passage formed in the shaft, a fan having its hub portion secured to the shaft for rotation therewith, the hub portion being provided with a passage forming a continuation of the shaft passage, the fan being provided with a series of blades having hollow portions formed therein, division strips in each of the blades for dividing the blades into separate compartments spaced circumferentially of the fan, means being provided in each of the division strips for permitting passage of fluid from one of the compartments to the other, one of said blades being formed with an entrance opening which registers with the hub portion, the succeeding blades having their hollow portions connected to the hollow portions of the preceding blades by means of a conduit, one of said succeeding blades being provided with a passage through which fluid is withdrawn from the fan, said last named passage leading into an exit passage formed through the hub portion and the rotating shaft.

6. In a heat exchange system, in combination a rotating shaft mounted on a suitable support, a fan mounted on a shaft for rotation therewith, the fan being provided with hollow blades having means therein for admitting and exhausting fluid, a shaft being provided with a longitudinal passage having a stop plug therein, a plurality of additional passages formed in and extending longitudinally of the shaft, anterior to the stop plug and leading from the aforementioned shaft passage so as to effect the flow of fluid from the shaft passage into the additional passages, connections provided for admitting fluid into the fan from the additional passages, the shaft passage continuing on the other side of the stop plug, means leading from the fan for admitting the exhausted fluid from the fan to said continued shaft passage and further means coacting with the continued shaft passage for withdrawing the exhausted fluid from the system.

7. In a heat exchange system for fluids comprising in combination a shaft rotatably mounted on a suitable support, a fan secured to the shaft for rotation therewith, the fan being provided with blades formed with hollow interior portions, entrance means cooperating with the hollow portions of the fan for admitting fluid thereto and exhaust means in said fan for permitting withdrawal of the fluid circulated through the fan, a longitudinal passage formed in the shaft, means for admitting fluid to said longitudinal passage, means for conducting fluid from said longitudinal passage to the fluid entrance means of the fan, a stop means being positioned in the shaft passage to divert the fluid into the fan, means cooperating with the shaft passage for permitting withdrawal of the fluid from the exhaust means of the fan, the stop means in the longitudinal passage also diverting the exhaust fluid into the shaft passage, and means associated with the shaft passage for permitting withdrawal of the fluid from the system, casing means surrounding the fan and forming a hollow space between the fan and the casing means, means being provided in said casing means for the admission of a heat exchange fluid, and additional means in said casing for providing for the withdrawal of said heat exchanging fluid.

8. In a heat exchange system for fluids comprising in combination a shaft rotatably mounted on a suitable support, a fan secured to the shaft for rotation therewith, the fan being provided with blades formed with hollow interior portions, entrance means cooperating with the hollow portions of the fan for admitting fluid thereto and exhaust means in said fan for permitting withdrawal of the fluid circulated through the fan, a longitudinal passage formed in the shaft, means for admitting fluid to said longitudinal passage, means for conducting fluid from said longitudinal passage to the fluid entrance means of the fan, a stop means being positioned in the shaft passage to divert the fluid into the fan, means cooperating with the shaft passage for permitting withdrawal of the fluid from the exhaust means of the fan, the stop means in the longitudinal passage also diverting the exhaust fluid into the shaft passage, and means associated with the shaft passage for permitting withdrawal of the fluid from the system, casing means surrounding the fan and forming a hollow space between the fan and the casing means, means being provided in said casing means for the admission of a heat exchange fluid, and additional means in said casing for providing for the withdrawal of said heat exchanging fluid, said casing being mounted to rotate with the shaft.

9. In a heat exchange system for fluids comprising in combination a shaft rotatably mounted on a suitable support, a fan secured to the shaft for rotation therewith, the fan being provided with blades formed with hollow interior portions, entrance means cooperating with the hollow portions of the fan for admitting fluid thereto and exhaust means in said fan for permitting withdrawal of the fluid circulated through the fan, a longitudinal passage formed in the shaft, means for admitting fluid to said longitudinal passage, means for conducting fluid from said longitudinal passage to the fluid entrance means of the fan, a stop means being positioned in the shaft passage to divert the fluid into the fan, means cooperating with the shaft passage for permitting withdrawal of the fluid from the exhaust means of the fan, the stop means in the longitudinal passage also diverting the exhaust fluid into the shaft passage, and means associated with the shaft passage for permitting withdrawal of the fluid from the system, casing means surrounding the fan and forming a hollow space between the fan and the casing means, means being provided in said casing means for the admission of a heat exchange fluid, and additional means in said casing for providing for the withdrawal of said heat exchanging fluid, the casing means being formed to surround the individual fan blades and mounted to rotate therewith.

10. A heat exchange system for fluids comprising a shaft mounted for rotation upon a suitable support, said shaft being formed with a continuous longitudinal passage extending therethrough, a plurality of fans mounted on the shaft and adapted to operate as heat exchanging units, said fans being provided with blades having hollow interior portions, means cooperating with the longitudinal shaft passage for separately admitting fluid to the hollow portions of the fan blades, power means cooperating with the longitudinal shaft passage for permitting the withdrawal of fluid which has circulated through the fans, stop means provided in the longitudinal passage for separating the entering fluid in each unit from the exit fluid, further stop means in said passage between the individual fan units for preventing entrance of any unit with another unit, and means associated with the longitudinal shaft passage for admitting fluid to each of the fans, additional means cooperating with the longitudinal shaft passage for effecting the withdrawal of the fluid from each of the fan units.

11. A heat exchange system for fluids comprising a shaft rotatably mounted upon a suitable support, a plurality of fans mounted upon the shaft for rotation therewith, said fans being provided with blades having hollow interior portions, means associated with each fan for permitting the entrance of fluid thereto, said means cooperating with a longitudinal shaft passage, means whereby the fluid to be treated is introduced into the said shaft passage, means for providing the stream of entering fluid, further means being provided for diverting the portions of the said divided stream into independent fan units, and further means associated with each fan unit for permitting the withdrawal of the fluid after circulation through the fan.

12. In a heat exchange system, a rotating shaft mounted on a suitable support, a fan mounted upon the shaft and adapted to rotate therewith, said fan being provided with hollow blades, each of said blades having its hollow portions provided with an opening for admitting fluid and another opening to which the fluid is discharged, casing means surrounding the fan and forming a hollow space between the fan and the casing means, means being provided in said casing means for the admission of a heat exchange fluid, and additional means in said casing for providing for the withdrawal of said heat exchanging fluid, said casing being mounted to rotate with the shaft.

13. In a heat exchange system, a rotating shaft mounted on a suitable support, a fan mounted upon the shaft and adapted to rotate therewith, said fan being provided with hollow blades, each of said blades having its hollow portions provided with an opening for admitting fluid and another opening to which the fluid is discharged, casing means surrounding the fan and forming a hollow space between the fan and casing means, means being provided in said casing means for the admission of a heat exchange fluid into said casing, through said shaft, and additional means in said casing for the withdrawal of said heat exchange fluid through said shaft.

14. In a heat exchange system, a rotating shaft mounted on a suitable support, a fan mounted upon the shaft and adapted to rotate therewith, said fan being provided with hollow blades, each of said blades having its hollow portions provided with an opening for admitting fluid and another opening to which the fluid is discharged, casing means surrounding the fan and forming a hollow space between the fan and the casing means, means being provided in said casing means for the admission of a heat exchange fluid, and additional means in said casing for providing for the withdrawal of said heat exchanging fluid, the casing means being formed to surround the individual fan blades and mounted to rotate therewith.

In testimony whereof I affix my signature.

MORTIMER T. MURPHY.